April 29, 1924.

J. ARMSTRONG

THERMOSTATIC RELAY VALVE

Filed July 14, 1921  3 Sheets-Sheet 1

1,492,115

Inventor
Joseph Armstrong
By Mitchell, Chadwick & Kent
Attorneys

April 29, 1924.
J. ARMSTRONG
THERMOSTATIC RELAY VALVE
Filed July 14, 1921   3 Sheets-Sheet 2
1,492,115
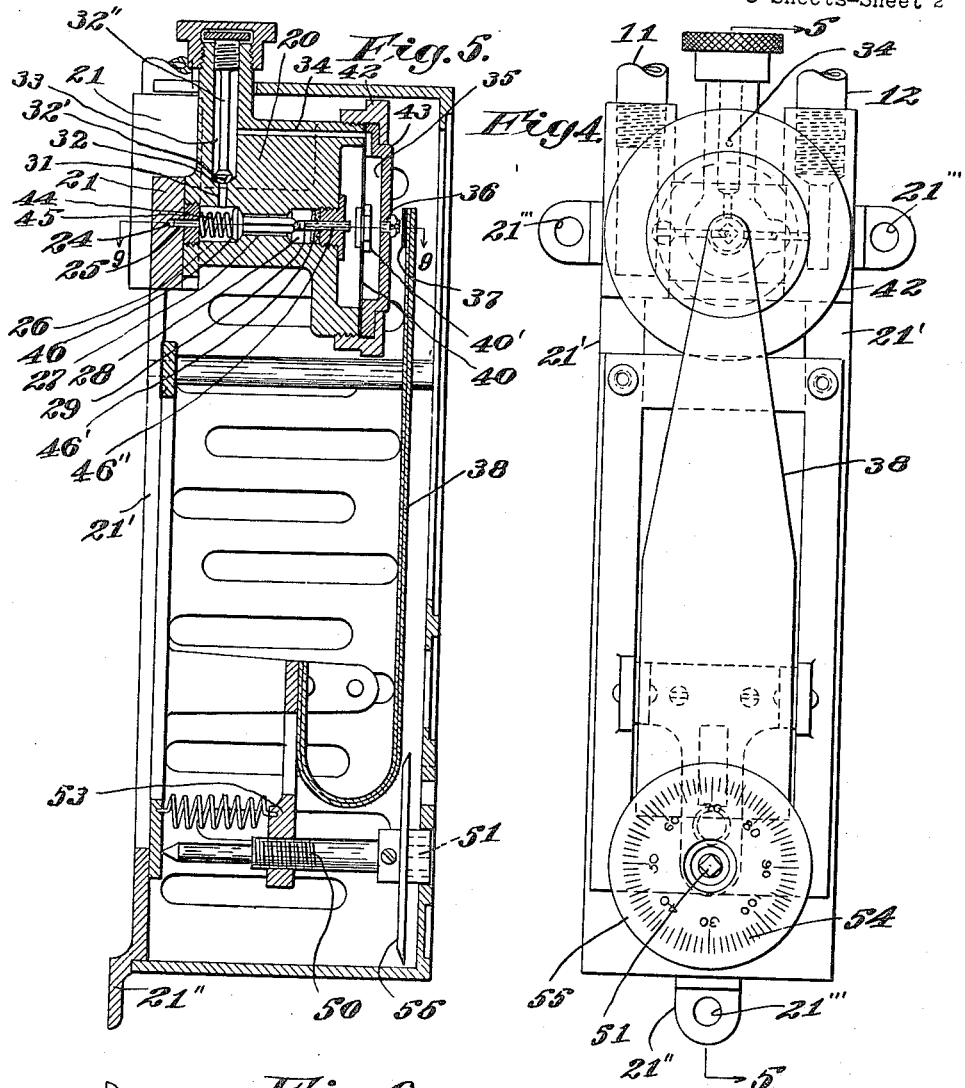
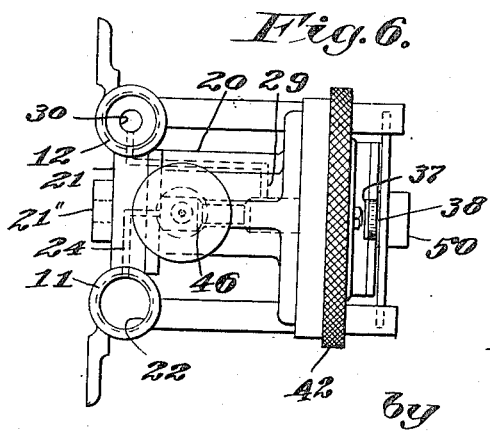
Inventor
Joseph Armstrong
By Mitchell, Chadwick & Kent
Attorneys April 29, 1924.

J. ARMSTRONG

THERMOSTATIC RELAY VALVE

Filed July 14, 1921

Inventor
Joseph Armstrong
by Mitchell, Chadwick & Kent
Attorneys

Patented Apr. 29, 1924.

1,492,115

UNITED STATES PATENT OFFICE.

JOSEPH ARMSTRONG, OF MALDEN, MASSACHUSETTS, ASSIGNOR TO AMERICAN MOISTENING COMPANY, OF BOSTON, MASSACHUSETTS, A CORPORATION OF MAINE.

THERMOSTATIC RELAY VALVE.

Application filed July 14, 1921. Serial No. 484,830.

*To all whom it may concern:*

Be it known that I, JOSEPH ARMSTRONG, a citizen of the United States, residing at Malden, in the county of Middlesex and State of Massachusetts, have invented certain new and useful Improvements in Thermostatic Relay Valves, of which the following is a specification.

This invention relates to improvements in thermostatic relay valves. It is herein illustrated as it may be applied to control automatically by compressed air the opening and closing of a valve in a steam pipe. The apparatus may, however, be actuated with fluids other than air, and may be arranged to cause the actuation of various sorts of apparatus, quite diverse in character. It is an object of the invention to improve upon relay valves heretofore proposed, by providing for construction of the same in a compact and simplified manner, within a neat and small casing, with the various parts easily accessible for maintenance or adjustment. These objects are accomplished by providing a single block of metal which contains within itself, with aid of its base and cover, all the various elements which comprise the relay apparatus, including the filter, the relay valve, the diaphragm chamber, with its vent and thermostatic valve for controlling the relay, and the operating means connecting said control chamber with the relay valve, by which is controlled the access of operating fluid to the main apparatus that is to be worked, as for example, and as herein illustrated, its access to the diaphragm controller of a steam valve which is to be opened or closed according to the fall or the rise of temperature at the place where the thermostat is located. The invention may be applied in various ways, details of one being shown in the accompanying drawings by way of illustration. It is intended that the patent shall cover by suitable expression in the appended claims whatever features of patentable novelty exist in the invention disclosed.

In the accompanying drawings:

Figure 4 is a front elevation of the apparatus seen in Figure 1, with the cover removed;

Figure 5 is a side elevation like Figure 2, in medial section on the line 5—5 of Figure 4;

Figure 6 is a plan of the same, with the cover removed;

Figure 2:
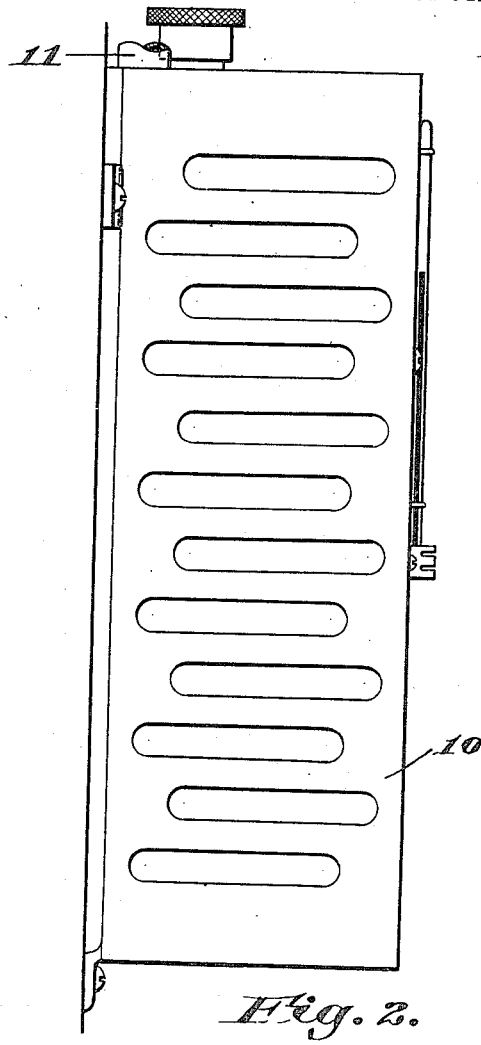
Figure 2 is a side elevation of the same.
Figure 1:
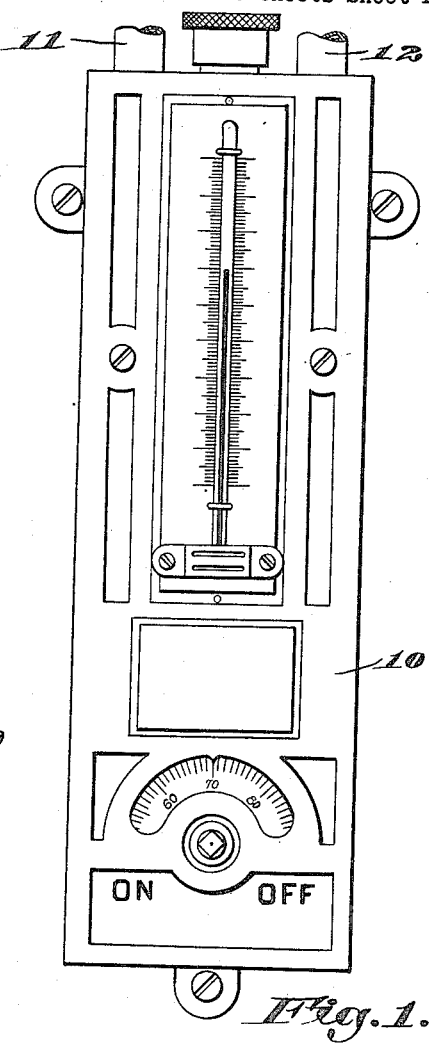
Figure 1 is a front elevation of apparatus embodying the invention.
Figure 3:
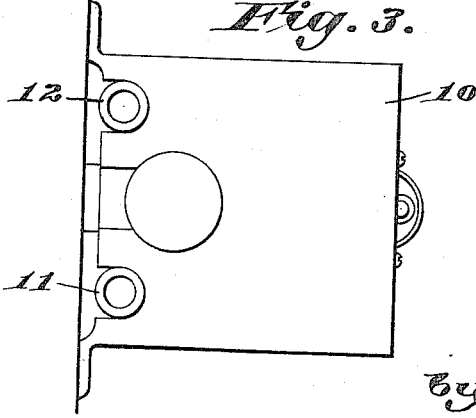
Figure 3 is a plan of the same.
Figure 7:
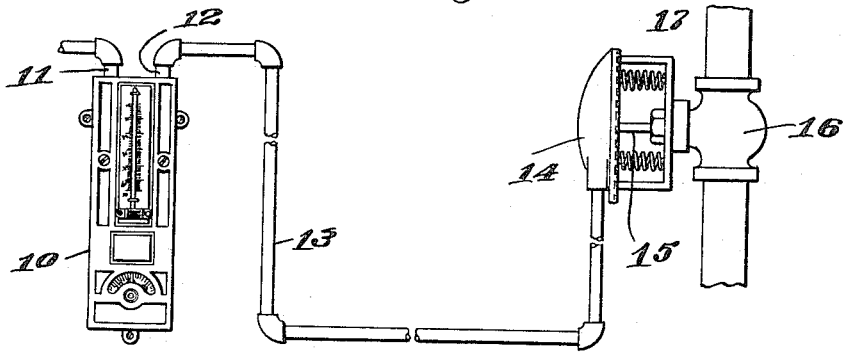
Figure 7 illustrates on a smaller scale the apparatus shown in Figure 1 with connection to the device at which the relay is completed.
Figure 8:
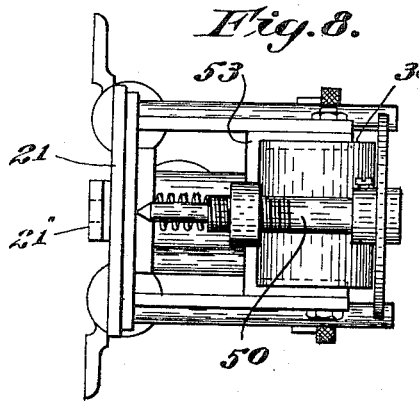
Figure 8 is a plan of the apparatus viewed from the bottom, with cover removed.

In the drawings Figure 7 shows at the left the apparatus of the invention having the cover casing 10, inlet 11 and outlet 12 and its connection through pipe 13 to a casing 14 containing a diaphragm for operating the stem 15 of a valve 16 in a pipe line. Springs 17 tend normally to open the valve 16; but are overcome when sufficient pressure exists in the casing 14, whereupon the valve stem 15 is pushed to the right thus closing the valve 16. When pressure falls in the casing 14 the springs 17 open the valve 16. If air is employed in the system it is possible to obtain with simple and convenient apparatus an extremely powerful pressure such as will easily control a high pressure of steam in the pipe and valve 16.

The invention is concerned more particularly with the construction, which in Figure 7, is concealed from view behind the casing 10, whose function is to control the air pressure in the casing 14, and to do this with satisfactory promptness upon the occurrence of the predetermined temperature, notwithstanding the extremely diminutive character of certain of the passages by which the control is effected. It will be understood that the drawings exaggerate the size of some of the passages for the sake of showing them clearly. The apparatus comprises a block 20 of brass or other suitable metal in which sundry interconnecting passages and superficial recesses having converings, cooperate with valves and a diaphragm therein. There is an auxiliary block 21 which, as illustrated, is also part of the base of the apparatus, bearing against the rear face of block 20.

Figure 9:
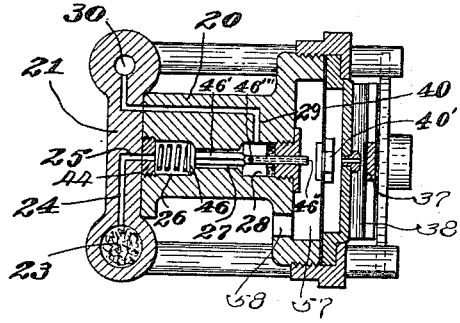
Figure 9 is a plan, in section on the line 9—9 of Figure 5.
Figure 10:
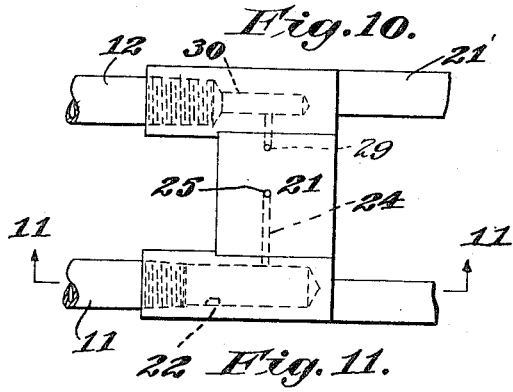
Figure 10 shows the interior face of one of the parts, as if viewed from the right in Figure 9.
Figure 11:
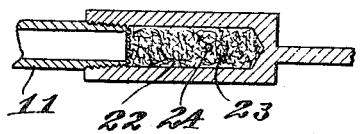
Figure 11 is a section of a detail, on the line 11—11 of Figure 10.

This has the two-barreled aspect seen in Figures 9 and 10. One of these barrels has the inlet nipple 11, which, in operation, is open to a constant supply of air under moderate pressure, as for example, ten pounds per square inch, which leads downward into a chamber 22 where there is filtering material 23, such as horse-hair, from which a small passage 24 seen in Figures 11, 10 and 9 leads horizontally through the web joining the barrels, as far as the middle of the base. The base of the apparatus also comprises the rails 21', which extend along and behind the sides of the remainder of the apparatus, down to the foot 21'' which has a screw hole 21''' for securing the apparatus to the wall of a room. The two-barrelled part of the base is at the top and rear of the apparatus as it normally hangs on the wall. Its central web, joining the barrels, lies against the back face of block 20 and contains the passage 24 and also part of passage 25 which runs horizontally forward to the surface of the web, toward eye in Figure 4 to connect with the interior valve chamber 26 which is formed in block 20 on the same axis with the passage 25. This chamber has two openings for escape of air. The one, 27, capable of being closed by valve 46, under pressure of air in chamber 26, extends along the axis in the same direction to an interior chamber 28 whence there is a passage 29 to the right, Figure 4, seen clearly in the plan view, Figure 9, that leads back through the block 20 into the base 21 and into a passage 30 therein which connects with an outlet nipple 12 and so leads on to the diaphragm of the valve 16 which is to be operated. This passage furnishes the air for operating the diaphragm and is therefore to be made of such size as will permit the filling of the casing 14 with air at the requisite pressure with the requisite promptness after the thermostatic element of the apparatus has experienced and registered the temperature at which it is desired to have the valve 16 operate. The other way 31, for escape of air from the valve chamber 26, extends upward Figure 5, but is greatly reduced at one point by an obstruction 32 seated across the passage. The air-way is continuously open only through a small channel 32' in the face of the obstructing body, illustrated by a mere mark, being such as may be made by a scratch of a file. This obstruction, which is removable, for the clearing away of any foreign matter that may clog such an extremely small passage, is herein referred to as a restriction valve although in operation it is always closed, except that air can pass it freely through the said restricted passage. Such air goes up into the chamber 33 which contains the restriction valve stem 32'', and thence escapes forward horizontally through a passage 34, which leads to a diaphragm chamber 35 whence there is a vent 36 to atmosphere. At certain temperatures this vent will be closed by a primary valve 37 set on the moving end of a thermostat 38. When the local temperature is low enough, a minute flow of air is constantly passing out from the valve chamber 26 through passage 31, the diminutive channed in 32, and passages 33 and 34 to the diaphragm chamber 35 and thence to atmosphere through the vent 36. But when the local temperature rises so high that the vent 36 becomes closed by the thermostat the constant flow of air quickly builds up enough pressure in the small diaphragm chamber 35 to bulge the diaphragm 40 inward, so that its central button 40' seats upon the end of stem 46' of the valve 46. Thereby it closes an axial passage 46'' in the end of that stem, which when open is the vent for the main diaphragm system 27, 28, 29, 30, 12, 13 and 14, with which it communicates through a small lateral hole 46''' in said stem (Figure 9). Further bulging of the diaphragm 40 opens the valve 46 and so opens the axial main passage 27 from valve chamber 26, thus admitting air under pressure to said main system. This diaphragm is so much larger than the valve 46 that only a little pressure is required to open it and overcome both air and the positioning spring 45, housed in the valve chamber 26. The spring may be based on a plug 44 screwed into the block 20 through which runs axially a continuation of the passage 25. The diaphragm is held peripherally by a cover 43 which clamps down its edges and by a cap 42 which screws on the outside of the block 20 to maintain this cap and diaphragm tight. The sequence and combination of passages, chambers, and valves permit air at desired pressure to fill the inlet and passages in the regulating apparatus at least as far as the valves 46 and 32. The latter permits an extremely small continuous current of air to flow, so long as the pressure in passages 33 and 34 and the diaphragm chamber 35 is low enough for flow to occur. This condition prevails with valve 46 closed so long as the vent 36 remains open. In consequence, the small vent 46'' by relieving the main system including the diaphragm within casing 14, keeps the air therein at atmospheric pressure; and the springs 17 maintain the valve 16 open.

The thermostat 38 may be of any ordinary or suitable type. As herein illustrated it is adjustable bodily on its mounting, with respect to the vent 36, by means of a screw shaft 50. A key hole 51 permits an end engagement of a key for turning shaft 50, thus setting the sub-base which supports the thermostat forward or back so that more or less amplitude of flexure of the thermostat 38 will be required to close the vent 36. The degree of setting may be observed and gauged by means of a scale 54 on the disk 55, which may be marked in degrees. When the temperature rises so that the corresponding amplitude of flexure is enough to close the vent 36, from whatever the setting is at the time, it takes but a short time for even the extremely restricted flow to raise the pressure in the diaphragm chamber 35 enough to flex the diaphragm 40, open the valve 46, and thus let the main flow of air through the passages 27, 28, 29, 30, 12 and 13 to build up pressure on the steam valve diaphragm in order to close that valve.

In the apparatus thus described the various interior passages can be made by drilling in various directions into or through the block 20 and then plugging permanently the exterior entrance portions of such of these holes thus made, as are not to be used. To avoid confusion and unnecessary complexity the unused parts of such drill holes, and the plugs therein are not shown in the drawings. The chamber 28 for the valve stem 46′ and the chamber 33 for the restriction valve stem 32′ may have their exterior entrances closed by movable plugs 55 and 56 respectively. In the case of the last mentioned, the plug 56 carries the stem 32″ of the valve 32 and is to be screwed down until the valve 32 is seated, according to the construction which forms the subject matter for application of Letters Patent by me jointly with Frank B. Comins, Serial No. 473,331.

The operation of the apparatus is as follows: Assume that the controlled valve 16 is open for flow of steam, and that the temperature in the region of the thermostatic element 38 is below that point at which the bending of the element closes the vent 36. The air in the pressure supply pipe 11 is then passing through inlet 11 to the filter 23 in chamber 22 in the base 21, and thence through the small passage 24 (Figs. 11, 10, 9), and the parts of passage 25 which are respectively in the base 21 and in the plug 44 into chamber 26 in the block 20. There it exerts pressure on the head of the valve 46 in direction to seat it. A small quantity of this air escapes from chamber 26 through passage 31 (Fig. 5) and channel 32′ in the face of the obstruction 32, into chamber 33 from which it continues on through passage 34 to the diaphragm chamber 35. It goes thence to atmosphere through the vent 36 which has been assumed to be open because of the valve 37 on the moving end of the thermostatic element 38 being slightly removed from the mouth of this vent 36. Under these conditions there is no pressure on the diaphragm in casing 14, which is vented to atmosphere through the pipe 13, outlet 12, passage 30 in the base 21 (Figs. 7, 10) passage 29 (Figs. 10, 9, 6) chamber 29 (Fig. 9) axial passage 46″ in stem 46′ of the valve 46, the chamber 57 under the diaphragm 40, and the hole 58 in the block 21. Accordingly steam is passing the valve 16 whose springs seen in Fig. 7 push the diaphragm and valve stem 15 in direction to open the valve 16, and thus to let steam pass. Upon the local temperature where the thermostatic element is located becoming high enough to move the element 38 toward the left in Fig. 5 until its valve 37 closes the vent 36 a change occurs because of making the diaphragm chamber 35 air tight. The continued though small flow of air into this chamber through restriction valve 32 and passage 34, as already described, soon builds up sufficient pressure therein to flex the diaphragm 40 and to bulge its central button 40′ against the end of the valve stem 46′ so as to close its axial passage 46″. This shuts off the vent from chamber 28. Upon further accumulation of pressure in the diaphragm chamber 35, and consequent further movement of the valve stem 46′, the valve 46 will be pushed from its seat, and the air supply from chamber 26 will flow past the now open valve 46, along the annular passage 27 around a portion of its stem, into the chamber 28. Thence it continues on through passages 29 and 30, outlet 12 and pipe 13 to the casing 14, where it operates upon the diaphragm therein to close valve 16 shutting off the steam supply. When the temperature thereafter falls, the element 38 moves to the right, opening vent 36, through which the pressure in diaphragm chamber 35 at once escapes. As a consequence, the diaphragm 40 returns to its normal position because of its own resiliency and because it is urged toward that position by the valve stem 46, transmitting the combined force of the supply pressure in chamber 26 and of the positioning spring 45, which together act constantly upon the head of valve 46 in direction to seat it. After this valve seats, further movement of the diaphragm 40, to its normal position, withdraws its button from the end of stem 46′ opening the axial passage 46″ and permitting the air which has been effective in keeping the valve 16 closed to escape into chamber 57 and thence to the atmosphere through hole 58. Upon the consequent reduction of pressure in the casing 14, the springs 17 cause the valve 16 to open and permit steam to flow again to warm the region where the thermostatic element is placed. Upon the rise of temperature the element will again respond and the cycle of operations described will be repeated.

I claim:

1. A thermostatic relay valve comprising a base having separate passages for fluid under pressure; a block mounted on said base having a main passage connecting with the separate passages of the base to form a continuous passage through the base and block; an auxiliary restricted passage within the block leading from said continuous passage and having a vent; a valve within the block, set in the continuous passage beyond its connection with the auxiliary passage and arranged with the fluid pressure in said continuous passage acting on its head, tending to seat it; a spring in said continuous passage pressing on said valve head and co-acting with the fluid pressure thereon to seat it; thermostatic means mounted on said base and adapted to close said vent; and means whereby the pressure which ensues in the auxiliary passage overcomes the combined pressures of said spring and the fluid in the continuous passage acting on the valve head whereby the valve is opened.

2. A thermostatic relay valve comprising a base having separate passages for fluid under pressure; a block mounted on said base having a main passage connecting with the separate passages of the base to form a continuous passage through the base and block; an auxiliary restricted passage within the block leading from said continuous passage and having a vent; a valve within the block, set in the continuous passage beyond its connection with the auxiliary passage and arranged with the fluid pressure in said continuous passage acting on its head in direction to seat it; thermostatic means mounted on said base and adapted to close said vent; and means whereby the pressure which ensues in the auxiliary passage overcomes the fluid pressure acting on the valve head and opens said valve.

3. A thermostatic relay valve comprising a base having separate passages for fluid under pressure, one of which passages has a relatively large diameter adapted to receive the end of an entering inlet pipe and continues of the same diameter beyond the end of said pipe and there has filtering material, constituting an entrance filtering chamber; and the other of which passage is relatively small and constitutes an exit passage leading to apparatus to be actuated; a block mounted on said base having a main passage connecting with the said entrance and exit passages to form a continuous passage through said base and block; an auxiliary restricted passage within the block leading from said continuous passage and having a vent; a valve within the block, set in the continuous passage beyond its connection with the auxiliary passage; thermostatic means mounted on said base and adapted to close said vent; and means whereby the pressure which ensues in the auxiliary passage may open the valve.

Signed at Boston, Massachusetts, this eleventh day of July, 1921.

JOSEPH ARMSTRONG.